(12) United States Patent
Takeda et al.

(10) Patent No.: US 7,954,134 B2
(45) Date of Patent: May 31, 2011

(54) SET BACK BOX WITH DIGITAL RECEIVER FOR UPGRADING TV WITH ANALOG RECEIVER

(75) Inventors: Koji Takeda, San Diego, CA (US);
Edson Takei, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 794 days.

(21) Appl. No.: 11/845,882

(22) Filed: Aug. 28, 2007

(65) Prior Publication Data

US 2009/0064265 A1    Mar. 5, 2009

(51) Int. Cl.
*H04N 7/16* (2006.01)
(52) U.S. Cl. ............ 725/151; 725/38; 725/59; 725/120; 725/131; 725/139; 348/734; 348/706; 348/558
(58) Field of Classification Search .............. 725/37–38, 725/59, 120, 131, 139, 151; 348/731–732, 348/734, 555, 558, 706
See application file for complete search history.

(56) References Cited

U.S. PATENT DOCUMENTS

| 5,553,140 A * | 9/1996 | Kubota et al. ................. 380/210 |
| 6,507,306 B1 * | 1/2003 | Griesau et al. ................ 341/176 |
| 7,017,178 B1 * | 3/2006 | Hendricks et al. ............ 725/152 |
| 7,548,675 B2 * | 6/2009 | Tatum et al. ................... 385/100 |
| 2006/0253875 A1 * | 11/2006 | Choi et al. ...................... 725/62 |
| 2006/0271987 A1 * | 11/2006 | Eisenberg et al. ............. 725/111 |
| 2008/0180574 A1 * | 7/2008 | Sadowski ...................... 348/561 |
| 2008/0186403 A1 * | 8/2008 | Douillet ........................ 348/461 |

* cited by examiner

*Primary Examiner* — Hunter B. Lonsberry
*Assistant Examiner* — Sumaiya A Chowdhury
(74) *Attorney, Agent, or Firm* — John L. Rogitz

(57) ABSTRACT

A set-back box (SBB) includes a digital TV signal receiver. The SBB can be connected via a HDMI cable to a TV having only an analog TV signal receiver so that digital TV signals from the SBB can be displayed on the TV screen. The TV processor recognizes the SBB and in effect treats the digital receiver of the SBB as its own, such that a single remote control can be used to control both analog channel selection within the TV and digital channel selection within the SBB.

18 Claims, 4 Drawing Sheets

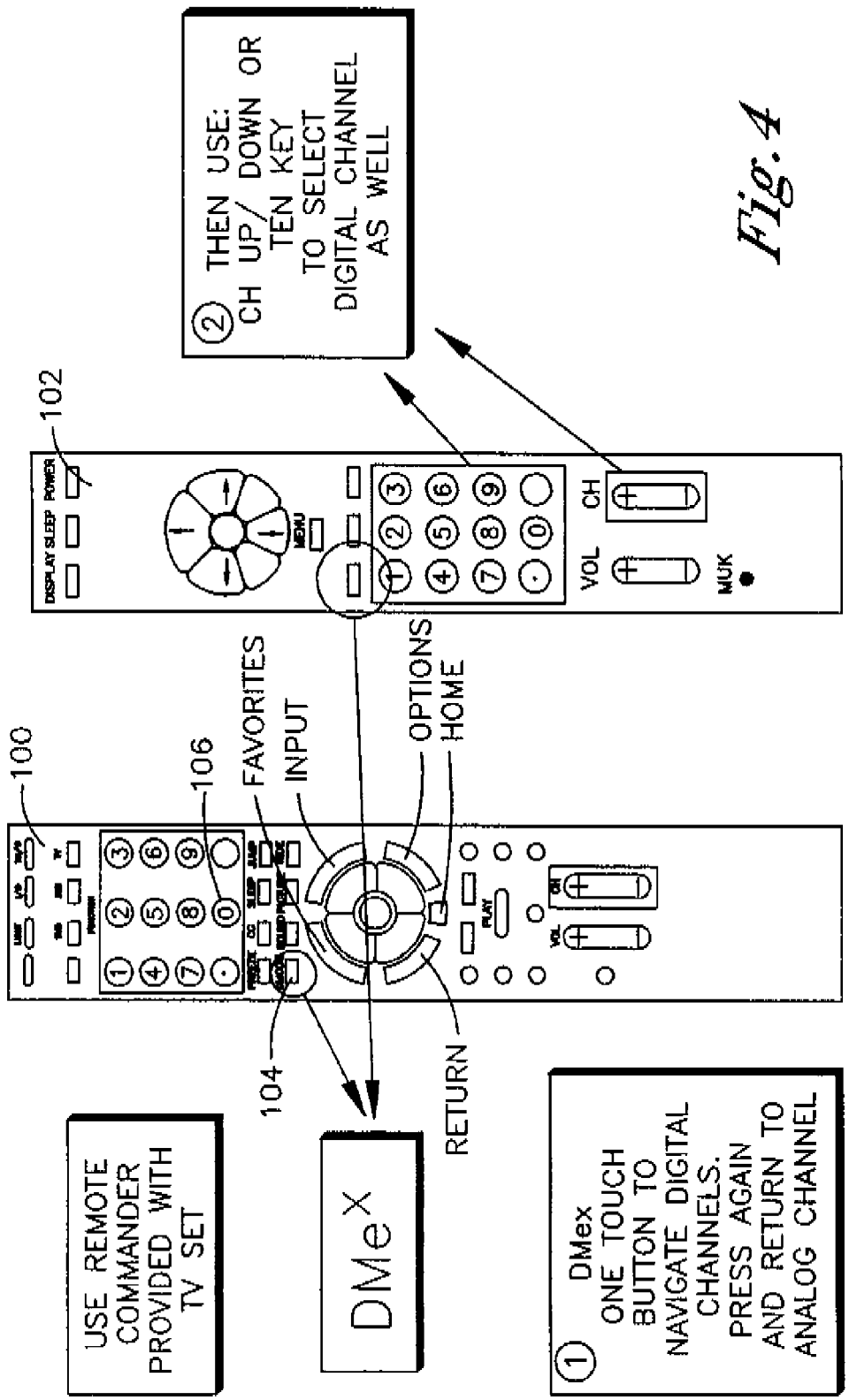

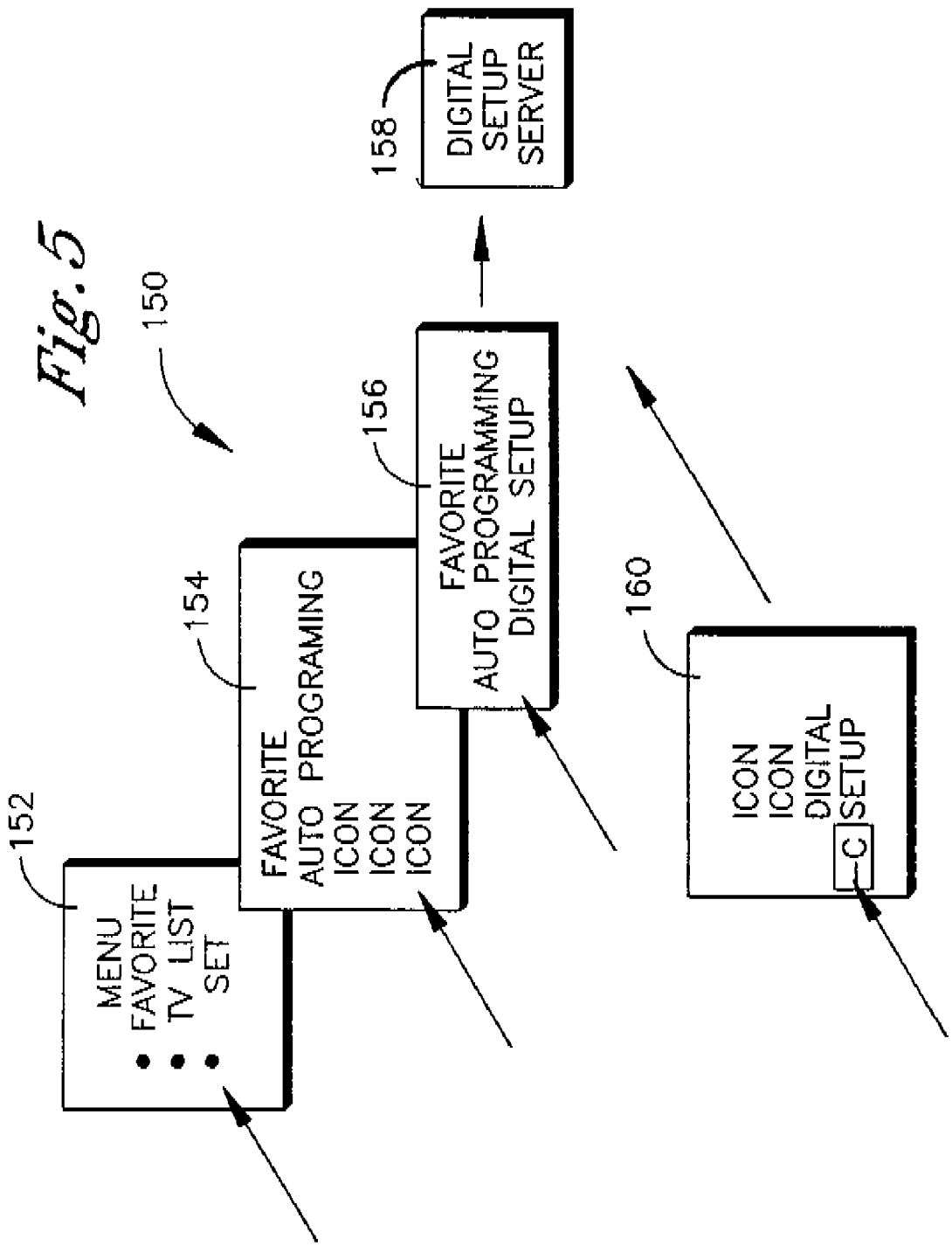

SET BACK BOX WITH DIGITAL RECEIVER FOR UPGRADING TV WITH ANALOG RECEIVER

FIELD OF THE INVENTION

The present invention relates generally to set back boxes (SBB) with digital receivers that can be used to upgrade TVs having only analog receivers.

BACKGROUND OF THE INVENTION

With the advent of digital television such as high definition TV, televisions that are provided only with analog receivers cannot be used to display digital channel signals even though many such channels advantageously might be provided by the TV signal provider. This is frustrating to consumers, who must purchase new TVs with digital receivers if they wish to avail themselves of digital TV programming.

SUMMARY OF THE INVENTION

A set back box (SBB) is disclosed for upgrading with digital capability a TV having a chassis holding a TV processor, an analog TV receiver, and no digital TV receiver. The SBB includes a housing and a digital TV receiver in the housing. The digital TV receiver is connectable through a high definition multimedia interface (HDMI) cable to the TV processor so that signals on digital channels received by the SBB can be displayed on the TV. The TV processor receives channel selection signals from a single remote control and passes digital channel selection signals to the SBB.

In some embodiments the housing of the SBB can be slidably engageable with a rear of the chassis of the TV.

In some embodiments the receiver can include a digital TV channel tuner that sends signals to a processor chip in the SBB. The processor chip can include an MPEG decoder. Furthermore, an advanced video coding (AVC) decoder such as an MPEG-4 part 10 decoder can be in the SBB and can communicate with the processor chip if desired. A main processor in the SBB is configured for receiving channel up/down signals from the TV.

In another aspect, a TV with a chassis holds an analog TV signal receiver and no digital TV signal receiver. A TV processor is in the chassis, and a remote control sends wireless channel up/down commands to the TV processor. A set back box (SBB) that is external to the TV chassis is electrically connected to the TV processor. The SBB provides digital TV signals to the TV for display thereof on the TV. Also, the SBB receives channel up/down signals from the TV processor and generated by the remote control, with the SBB configuring a digital channel tuner in response thereto.

In yet another aspect, a method for upgrading a TV having analog receive capabilities only includes connecting a set back box (SBB) to a digital signal port of the TV, and displaying digital TV signals from the SBB on the TV. The method also includes inputting channel up/down commands to the TV and selectively sending at least some of the up/down commands to the SUB. The SBB is tuned in accordance with the up/down commands it receives.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 shows front views of two alternate remote controls that can be used to select channels from both the TV and SBB; and FIG. 5 is a series of screen shots illustrating digital channel setup.

DETAILED DESCRIPTION OF THE PREFERRED EMBODIMENT

Various acronyms are used herein, including low voltage differential signalling (LVDS), Sony-Phillips digital interface (SPDIF), complex programmable logic device (CPLD), advanced video coding (AVC), "YCbCr" referring to digital video characteristics known as luma (Y) and chroma (CbCr), universal asynchronous receiver transmitter (UART), and serial transport stream (TS).

Figure 1:
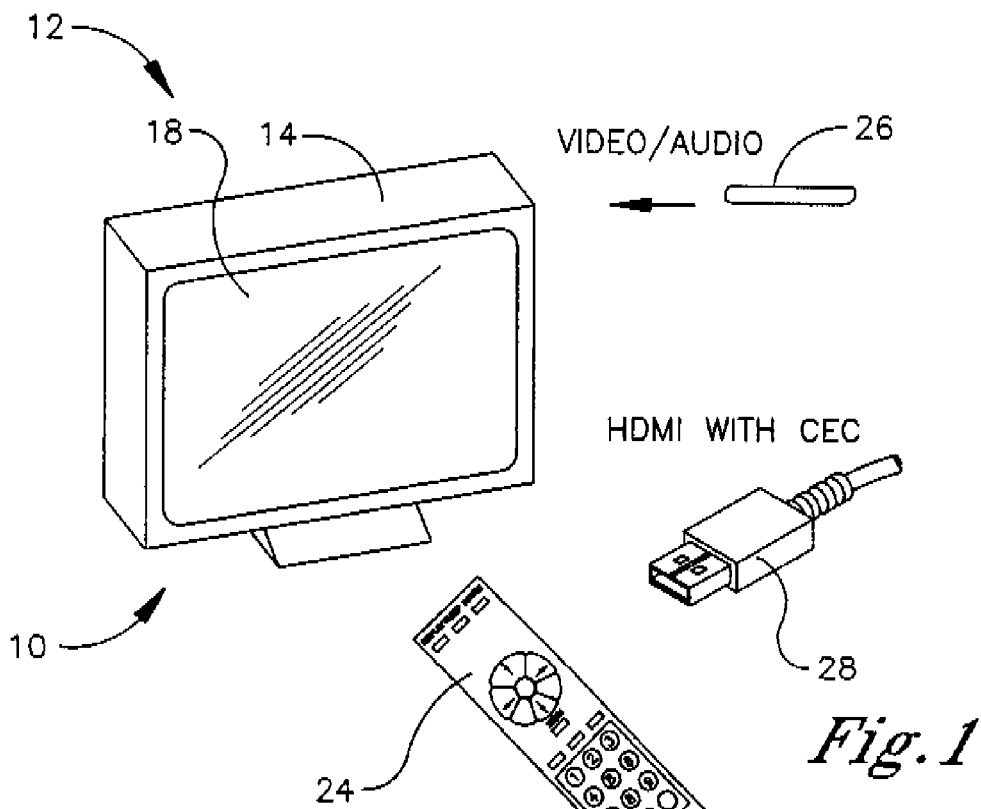
FIG. 1 is an exploded perspective view of a TV with remote control and set back box (SBB)
Figure 2:
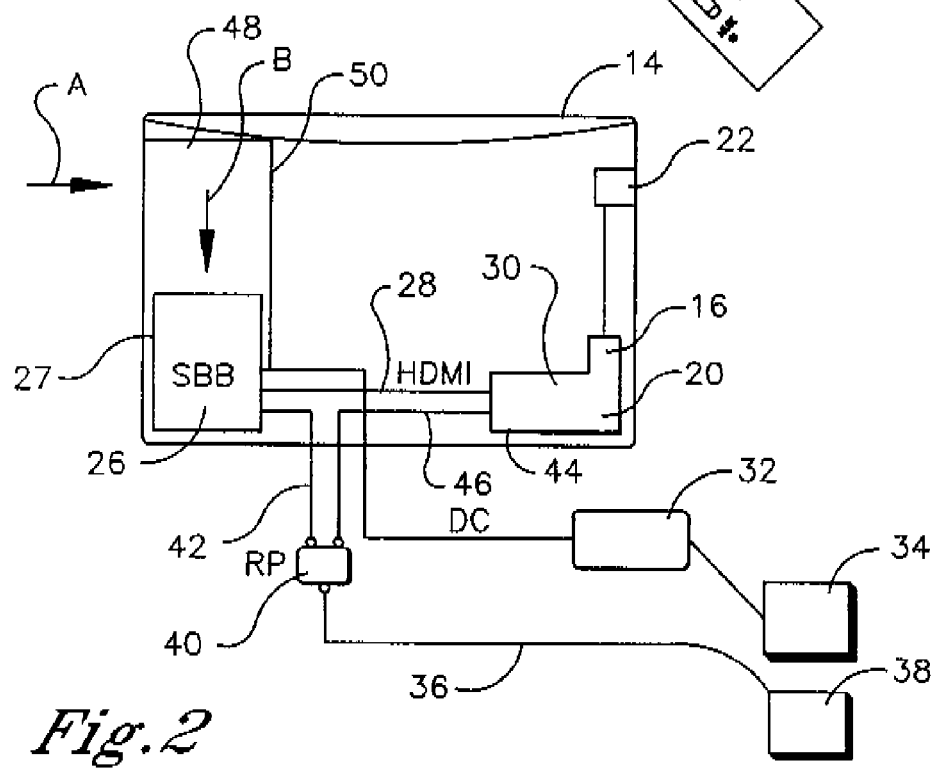
FIG. 2 is a schematic rear elevation view of the TV chassis with SBB engaged with the chassis.

Referring initially to FIGS. 1 and 2, a system is shown, generally designated 10, which can include a TV 12 with TV chassis 14 holding a TV processor 16 (FIG. 2) and display 18 (FIG. 1) such as but not limited to a flat panel display. The TV chassis 14 holds no digital TV receiver, but it contains an analog TV receiver 20 that processes analog TV signals and that may be electrically connected to the TV processor 16. Also connected to the TV processor 16 and shown in FIG. 2 is a command signal receiver 22 such as an IR receiver for receiving wireless commands such as channel up/down commands from a portable hand-held remote control 24.

FIGS. 1 and 2 show that a set-back box 26 can be connected to the TV 12 to provide digital video and audio to the TV 12. The SBB 26 includes a lightweight metal or plastic SBB housing 27 that holds internal components discussed further below that can be electrically connected to components in the TV 12 by means of a digital TV signal cable 28, such as a HDMI consumer electronics control (CEC) cable.

With more specificity and with particular attention to FIG. 2, the digital cable can be engaged with a digital port 30 of the TV 12 and with components of the SBB. In one non-limiting implementation, the SBB 26 receives DC power from a transformer 32 that can be plugged into an AC wall socket 34 as shown. A main TV signal cable 36 that can carry satellite TV signals and/or cable TV signals can extend from, e.g., a wall-mounted cable jack 38 to a signal splitter 40, which sends digital TV signals to the SBB 26 through a digital signal line 42 and analog TV signals to an analog jack 44 of the TV 12 through an analog signal line 46. In turn, as discussed further below digital TV signals are sent from the SBB 26 to the TV 12 via the digital TV signal cable 28 for display on the display 18.

In some embodiments the SBB 26 is slidably engageable with the chassis 14 of the TV 12. For example, the SBB 26 can be slid in the direction indicated by the arrow "A" along first guide structure 48 (such as a channel or rail) in the rear of the chassis 14 and then slid perpendicular thereto along a second guide structure 50 to the location shown in FIG. 2.

Figure 3:
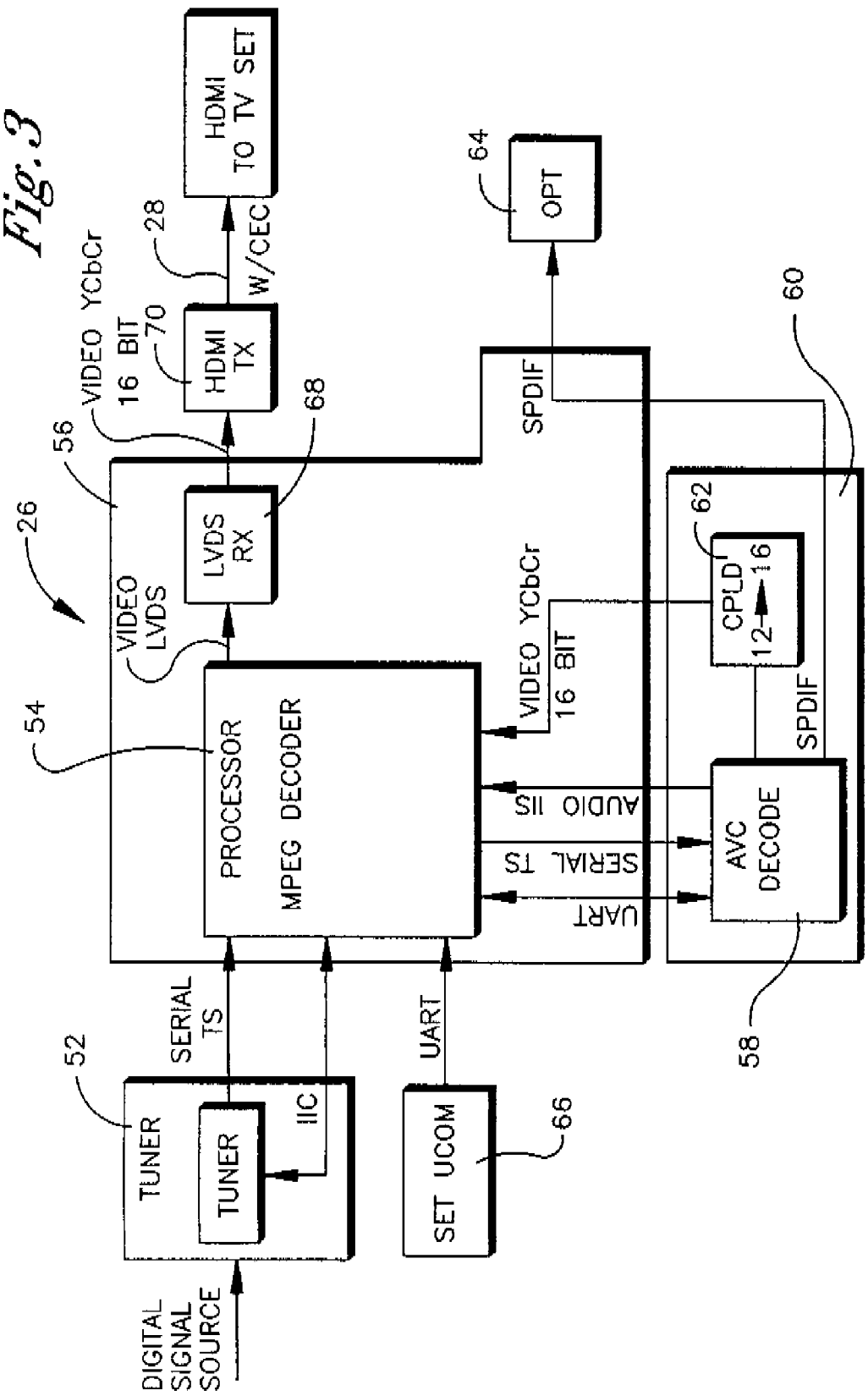
FIG. 3 is a block diagram of a non-limiting embodiment of the SBB.

Now referring to FIG. 3, an example SBB 26 is shown. Digital TV signals may be received at a tuner 52 in the SBB 26 housing. The tuner 52 may exchange IIC signals with a processor/MPEG decoder chip 54 on a substrate 56, also in the SBB 26 housing. The tuner 52 can also send serial TS signals to the processor chip 54 as shown. The tuner 52 alone or together with the processor chip 54 and/or the below-mentioned AVC decoder chip 58 can establish a digital TV signal receiver.

The processor chip 54 may communicate UART signals and serial TS signals to an AVC decoder chip 58 on a substrate 60 within the SBB 26 as shown, it being understood that a single chip may be used to execute the functions of both the processor chip 54 and AVC decoder chip 58 if desired. The AVC decoder chip 58 may send audio IIS signals to the processor chip 54 as well as 16 bit video YCbCr information via a 12 bit to 16 bit converter CPLD 62. Further, the AVC decoder 58 may send SPDIF signals to an optional SPDIF jack 64 on the TV 12 as shown.

As set forth further below, the processor chip 54 may receive, from the TV processor 16, commands such as channel up and down commands generated by the remote control 24. These commands may be relayed through a main SBB processor 66 and may be in UART format. The main SBB processor 66 controls the SBB components including the tuner 52 according to channel up/down commands it receives from the TV processor 16, so that a person need use only a single remote control 24 to control both the TV processor 16 (and, hence, analog channel selection) as well as the tuner 52 in the SBB 26 (and, hence, digital channel selection). The digital TV signals from the channel established by the tuner 54 are sent through an LVDS receiver 68 and if desired a HDMI transmitter 70 to the TV 12 over the digital TV signal cable 284.

When the SBB 26 is initially connected to the TV 12, an authentication process is executed in which the SBB 26 informs the TV 12 of its presence and appropriate authentication is passed between the two components. In this way, the TV processor 16 is apprised of the existence of the SBB 26 and it capabilities, particularly its capabilities to provide digital TV signals to the TV 12.

FIG. 4 illustrates two embodiments 100, 102 of the remote control 24 shown in FIG. 1. Only one of the remote controls 100, 102 typically is used to control both analog channel selection and digital channel selection. A digital channel control select key 104, labeled for illustration purposes "DMex" in FIG. 4, may be provided on, e.g., the remote control 100. By manipulating the select key 104 the user commands the TV processor 16 to forward subsequent channel up/down commands generated by manipulation of channel control keys 106 to the SBB 26, for selection of a digital channel by the user. Subsequently toggling the select key 104 results in subsequent channel up/down commands being interpreted by the TV processor 16 as pertaining to analog channel selection. Thus, with the touch of a single key the user can control, using a single remote control 100, both digital channel selection and analog channel selection. It is to be understood that the above principles apply as well to remote controls with different key layouts, such as the remote control 102.

FIG. 5 shows two alternate embodiments of graphical user interfaces (GUI) that can be displayed on the TV screen 18 to allow a user to set up use of the SBB 26. Necessary software for presenting the below-described GUIs may be downloaded from the SBB 26 to the TV 12 during authentication if desired.

A set 150 of hierarchical screens may be presented to a user at, e.g., the conclusion of the above-described authentication process. A user can manipulate the remote control 24 as appropriate to select a "set" function in a list of functions on an initial GUI screen 152, which causes a second GUI screen 154 to appear. The list of functions on the first screen 152 may include, e.g., "Menu" to cause a menu to appear, "favorites" to cause a list of user-designated favorite channels to appear, "TV list" to cause a list of all available channels to appear, as well as "set".

The second GUI screen 154 may present a list in response to receiving selection of "set" from the first screen 152, including, e.g., "favorites" to set favorites, "auto programming" to implement automatic channel programming, "label" to allow a user to label channels, and various icons, a predetermined one of which may be selected to cause a third screen 156 to appear. As shown, the third screen 156 allows selection of, e.g., favorites and auto programming as well as "digital setup", selection of which causes a digital setup screen 158 to appear. The digital setup screen 158 may present GUI elements to allow a user to set up digital TV features in accordance with digital TV principles known in the art.

Alternatively, a single entry screen 160 may be presented on the TV display 18 which shows various icons, one of which can represent "digital setup" as shown. Selection of this icon causes the digital set up screen 158 to appear. The entry screen 160 may be pattered after Sony's cross-media bar (XMB) GUI.

While the particular SET BACK BOX WITH DIGITAL RECEIVER FOR UPGRADING TV WITH ANALOG RECEIVER is herein shown and described in detail, it is to be understood that the subject matter which is encompassed by the present invention is limited only by the claims.

What is claimed is:

1. A set back box (SBB) for a TV having a chassis holding TV processor, an analog TV receiver, and no digital TV receiver, comprising:
a housing; and
at least one digital TV receiver in the housing, wherein the digital TV receiver is connectable through a high definition multimedia interface (HDMI) cable to the TV processor so that signals on digital channels received by the SBB can be displayed on the TV, the TV processor receiving channel selection signals from a single remote control and passing digital channel selection signals to the SBB, the SBB sending digital TV signals to the TV having the chassis holding the TV processor, the analog TV receiver, and no digital TV receiver such that the TV presents the digital TV signals from the digital TV receiver in the SBB on the TV.

2. The SBB of claim 1, wherein the housing of the SBB is slidably engageable with a rear of the chassis of the TV.

3. The SBB of claim 1, wherein the housing of the SBB includes a digital TV channel tuner.

4. The SBB of claim 3, wherein the tuner sends signals to at least one processor chip in the SBB.

5. The SBB of claim 4, wherein the processor chip includes an MPEG decoder.

6. The SBB of claim 5, comprising an AVC decoder in the SBB and communicating with the processor chip.

7. The SBB of claim 3, comprising a main processor in the SBB configured for receiving channel up/down signals from the TV.

8. The system of claim 3, comprising a main processor in the SBB and receiving channel up/down signals from the TV.

9. A system, comprising:
a TV with a chassis holding an analog TV signal receiver and no digital TV signal receiver;
a TV processor in the chassis;
a remote control sending wireless channel up/down commands to the TV processor; and
a set back box (SBB) external to the TV chassis and electrically connected to the TV processor, the SBB providing digital TV signals to the TV for display thereof on the TV, the SBB receiving channel up/down signals from the TV processor and generated by the remote control, the SBB configuring a digital channel tuner in response thereto.

10. The system of claim 9, comprising a high definition multimedia interface (HDMI) cable connecting the TV processor to the SBB so that signals on digital channels received by the SBB can be displayed on the TV.

11. The system of claim 9, wherein the SBB is slidably engaged with a rear of the chassis of the TV.

12. The system of claim 9, wherein the digital channel tuner sends signals to at least one processor chip in the SBB.

13. The system of claim 12, wherein the processor chip includes an MPEG decoder.

14. The system of claim 13, comprising an AVC decoder in the SBB and communicating with the processor chip.

15. A method for upgrading a TV having analog receive capabilities only, comprising:
  connecting a set back box (SBB) to a digital signal port of the TV;
  displaying digital TV signals from the SBB on the TV;
  inputting channel up/down commands to the TV;
  selectively sending at least some of the up/down commands to the SBB; and
  tuning the SBB in accordance with the at least some of the up/down commands.

16. The method of claim 15, further comprising not sending at least some of the up/down commands to the SBB and instead tuning an analog tuner in the TV in accordance therewith.

17. The method of claim 16, comprising using one and only one remote control to tune both the SBB and analog tuner.

18. The method of claim 17, wherein the remote control has a key that can be toggled to select whether to cause channel/up down commands generated by the remote control to effect the SBB or the analog tuner.

* * * * *